(12) United States Patent
Kabra et al.

(10) Patent No.: US 11,630,779 B2
(45) Date of Patent: Apr. 18, 2023

(54) HYBRID STORAGE DEVICE WITH THREE-LEVEL MEMORY MAPPING

(71) Applicant: Seagate Technology LLC, Fremont, CA (US)

(72) Inventors: Nitin Satishchandra Kabra, Mohammadwadi Pune (IN); Jackson Ellis, Fort Collins, CO (US); Niranjan Anant Pol, Erandwane Pune (IN); Mark Ish, Castro Valley, CA (US)

(73) Assignee: Seagate Technology, LLC, Fremont, CA (US)

( * ) Notice: Subject to any disclaimer, the term of this patent is extended or adjusted under 35 U.S.C. 154(b) by 0 days.

(21) Appl. No.: 17/528,977

(22) Filed: Nov. 17, 2021

(65) Prior Publication Data
US 2022/0075729 A1    Mar. 10, 2022

Related U.S. Application Data

(63) Continuation of application No. 15/609,651, filed on May 31, 2017, now Pat. No. 11,221,956.

(51) Int. Cl.
*G06F 12/0873* (2016.01)
*G06F 12/128* (2016.01)
*G06F 12/02* (2006.01)

(52) U.S. Cl.
CPC ...... *G06F 12/0873* (2013.01); *G06F 12/0292* (2013.01); *G06F 12/128* (2013.01); *G06F 2212/1024* (2013.01); *G06F 2212/217* (2013.01); *G06F 2212/222* (2013.01)

(58) Field of Classification Search
None
See application file for complete search history.

(56) References Cited

U.S. PATENT DOCUMENTS

| | | | | |
|---|---|---|---|---|
| 9,507,538 B2* | 11/2016 | Keeler | ............ | G06F 3/0643 |
| 2014/0013043 A1* | 1/2014 | Yano | ............ | G06F 12/0246 |
| | | | | 711/103 |
| 2017/0031601 A1* | 2/2017 | Arai | ............ | G06F 12/0246 |

* cited by examiner

*Primary Examiner* — Stephanie Wu
(74) *Attorney, Agent, or Firm* — Taylor English Duma LLP

(57) ABSTRACT

A hybrid storage device with three-level memory mapping is provided. An illustrative device comprises a primary storage device comprising a plurality of primary sub-blocks; a cache memory device comprising a plurality of cache sub-blocks implemented as a cache for the primary storage device; and a controller configured to map at least one portion of one or more primary sub-blocks of the primary storage device stored in the cache to a physical location in the cache memory device using at least one table identifying portions of the primary storage device that are cached in one or more of the cache sub-blocks of the cache memory device, wherein a size of the at least one table is independent of a capacity of the primary storage device.

20 Claims, 5 Drawing Sheets

FIG. 5

| HYPU DRAM (10 Entries Max) | HDD HOT Ness Tracker | | | 500 |
|---|---|---|---|---|
| Last/Next | TimeStamp | WrCnt | RdCnt | HDDSubBlk#/HPA Range |
| Last/Next | TimeStamp | WrCnt | RdCnt | HDDSubBlk#/HPA Range |
| Last | TimeStamp | WrCnt | RdCnt | HDDSubBlk#/HPA Range |

HYBRID STORAGE DEVICE WITH THREE-LEVEL MEMORY MAPPING

REFERENCE TO RELATED APPLICATION

This application is a continuation of U.S. application Ser. No. 15/609,651 filed May 31, 2017 which is hereby specifically incorporated by reference herein in its entirety.

SUMMARY

In some embodiments, a device comprises a primary storage device comprising a plurality of primary sub-blocks; a cache memory device comprising a plurality of cache sub-blocks implemented as a cache for the primary storage device; and a controller configured to map at least one portion of one or more primary sub-blocks of the primary storage device stored in the cache to a physical location in the cache memory device using at least one table identifying portions of the primary storage device that are cached in one or more of the cache sub-blocks of the cache memory device, wherein a size of the at least one table is independent of a capacity of the primary storage device.

Other illustrative embodiments include, without limitation, apparatus, systems, methods and computer program products comprising processor-readable storage media.

BRIEF DESCRIPTION OF THE DRAWINGS

FIG. 5 illustrates a sample promotion table, according to at least one embodiment of the disclosure.

DETAILED DESCRIPTION

Illustrative embodiments will be described herein with reference to exemplary storage devices, such as hard disk drives (HDD) and/or solid state drives (SSD) and associated storage media, controllers, and other processing devices. It is to be appreciated, however, that these and other embodiments are not restricted to the particular illustrative system and device configurations shown. Accordingly, the term "hybrid storage device" as used herein is intended to be broadly construed, so as to encompass, for example, any storage device employing the hybrid storage, SSD caching and/or three-level mapping techniques described herein. Numerous other types of storage systems are also encompassed by the term "hybrid storage device" as that term is broadly used herein.

In one or more embodiments, improved hybrid storage techniques are provided that employ a cache memory device, such as an SSD memory, as a cache for a primary storage device, such as an HDD or another SSD. A hybrid controller in at least one embodiment maps sub-blocks of the primary storage device (e.g., an HDD or another SSD) that are stored in the cache to corresponding physical locations in the cache memory device using a three-level map identifying portions of the primary storage device that are cached in sub-blocks of the cache memory device. In some embodiments, a size of the three-level map is independent of a capacity of the primary storage device.

For example, in one or more embodiments, the disclosed hybrid storage system can be implemented as a solid state hybrid drive (SSHD) where the cache memory device is implemented as an SSD memory and the primary storage device is implemented as an HDD. In other exemplary embodiments of the disclosed hybrid storage system, the cache memory device can be implemented as an SSD memory, such as a multi-level cell (MLC) flash memory device or a triple-level cell (TLC) flash memory device, and the primary storage device can be implemented as another SSD memory, such as a quad-level cell (QLC) flash memory device or a TLC flash memory device, or any suitable combination of primary SSD memory and SSD cache.

In at least one embodiment, the three-level map comprises a zero-level map implemented as a content addressable memory (CAM), where an address of each entry identifies one sub-block of the cache memory device and where a content of each entry identifies at least portions of the sub-blocks of the primary storage device that are stored in corresponding sub-blocks of the cache memory device. In addition, a primary storage device-to-cache memory device mapper identifies where a given portion of the primary storage device is stored within one or more sub-blocks of the cache memory device. The primary storage device-to-cache memory device mapper provides an index into a two-level map.

Figure 1:
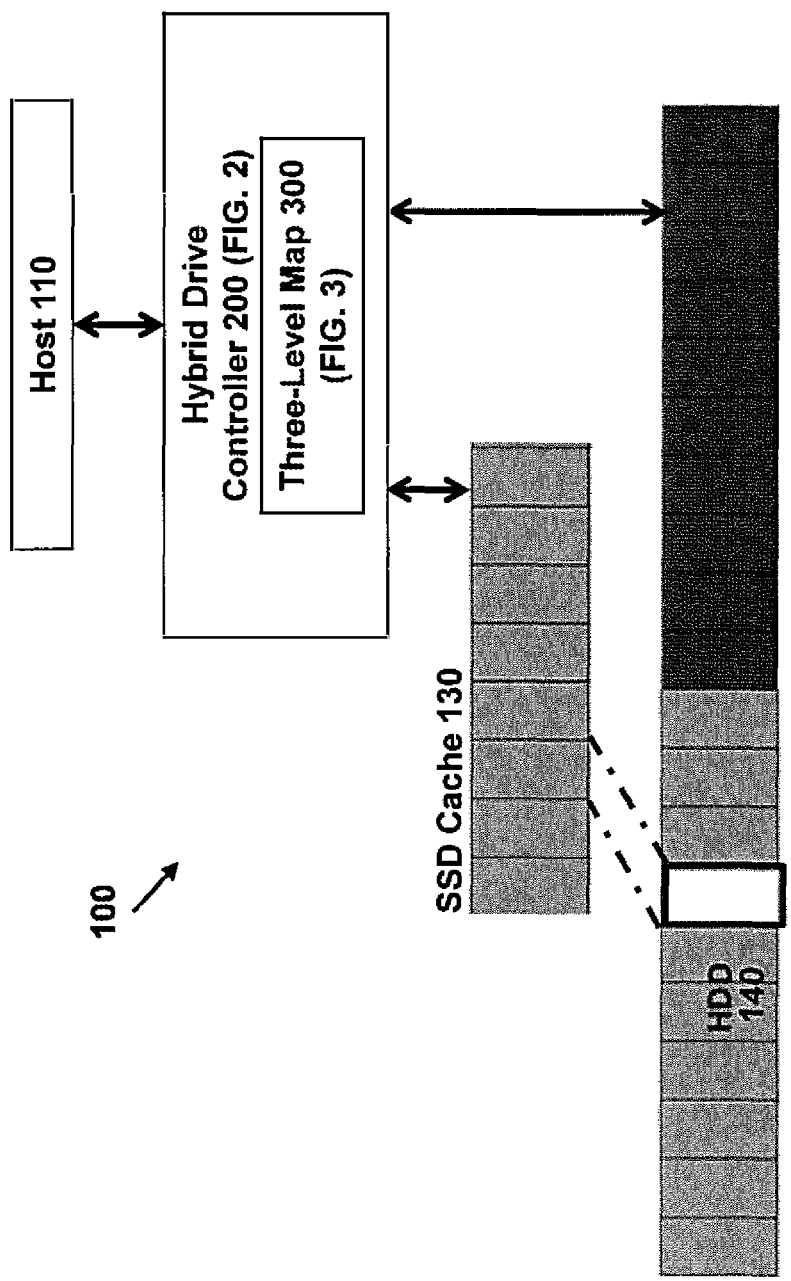
FIG. 1 is a block diagram of a hybrid storage system, in an illustrative embodiment of the present disclosure.

In addition, in some embodiments, improved techniques are provided for recovery and coherence, as well as promotion and demotion of data into, and out of, the SSD cache, respectively. FIG. 1 is a block diagram of a hybrid storage system 100, in an illustrative embodiment of the present disclosure. The exemplary hybrid storage system 100 comprises a hybrid drive controller 200, discussed further below in conjunction with FIG. 2, and a number of storage components. In the exemplary embodiment described in the figures, the cache memory device is implemented as a solid state disk/drive 130 and the primary storage device is implemented as a hard disk drive 140. As noted above, in other exemplary embodiments, the cache memory device can be implemented, for example, as a first SSD memory, such as an MLC or TLC flash memory device, and the primary storage device can be implemented as another SSD memory, such as a QLC or TLC flash memory device, or any suitable combination of primary SSD memory and SSD cache. The hybrid drive controller 200 is coupled to a host processor 110. As discussed hereinafter, in one or more embodiments, the exemplary SSD 130 serves as a cache for the HDD 140. In the exemplary embodiment of FIG. 1, the SSD 130 and the HDD 140 are comprised of a plurality of sub-blocks of substantially equal size. For example, the SSD 130 and the HDD 140 are comprised of a plurality of 128 MB (megabyte) sub-blocks. A three-level map 300, discussed further below in conjunction with FIG. 3, maps portions of the sub-blocks of the HDD 140 that are stored in the SSD cache 130 to a physical location in the SSD cache 130.

As discussed hereinafter, the SSD cache 130 can be configured to temporarily store data of the HDD 140. The HDD 140 includes a memory space that corresponds to a number of memory sectors, each sector addressable using a substantially unique host page address (HPA). The sectors of the HDD 140 are directly accessible by the host 110 using the HPAs, and thus the corresponding HPAs of the HDD 140 are referred to herein as host HPAs.

The host 110 sends memory access requests to the hybrid drive controller 200 to read or write data. The memory access requests may specify a host HPA range used for the operation of the memory access request. For example, a memory access request from the host 110 may request that a host HPA range be written to the hybrid storage system 100 and/or a memory access request may request that a host HPA range be read from the hybrid storage system 100. The memory access requests received from the host 110 are managed by the hybrid drive controller 200 to cause data to be written to and/or read from the hybrid storage system 100.

Figure 2:
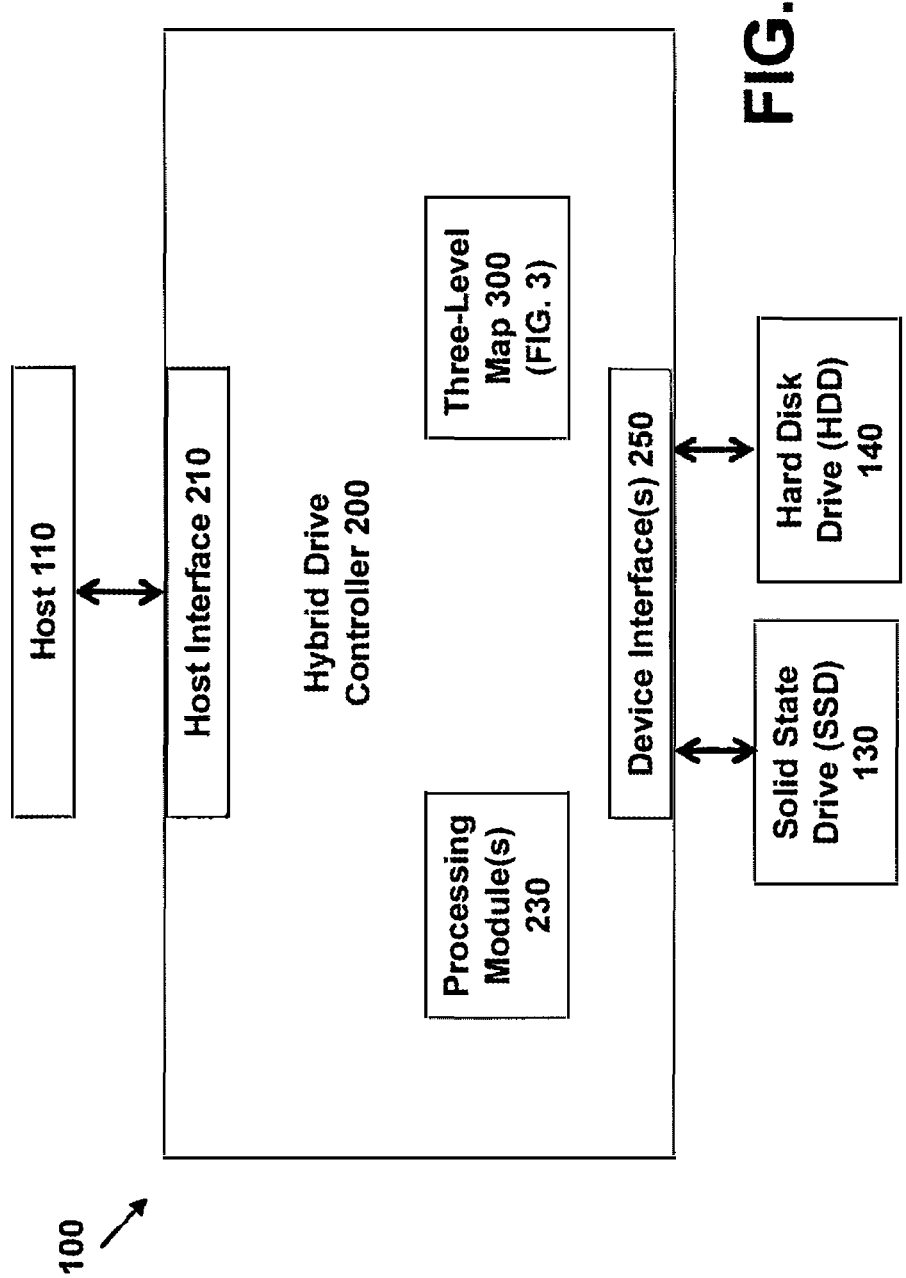
FIG. 2 illustrates the hybrid storage system of FIG. 1 in further detail, in one embodiment of the present disclosure.

FIG. 2 illustrates the hybrid storage system 100 of FIG. 1 in further detail, in an illustrative embodiment of the present disclosure. As shown in FIG. 2, the hybrid drive controller 200 may be coupled via one or more host interfaces 210 to the host 110. According to various embodiments, the host interfaces 210 may be implemented as one or more of: a serial advanced technology attachment (S ATA) interface; a serial attached small computer system interface (serial SCSI or SAS interface); a (peripheral component interconnect express (PCIe) interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, the hybrid drive controller 200 includes a SATA interface and a PCIe interface.

The hybrid drive controller 200 is further coupled via one or more device interfaces 250 to one or more storage devices, such as SSD 130 and HDD 140. According to various embodiments, device interfaces 250 are one or more of: an asynchronous interface; a synchronous interface; a double data rate (DDR) synchronous interface; an ONFI (Open NAND Flash Interface) compatible interface, such as an ONFI 2.2 compatible interface; a Toggle-mode compatible non-volatile memory interface; a non-standard version of any of the preceding interfaces; a custom interface; or any other type of interface used to connect to storage devices.

The 200 may have one or more processing modules 230, such as data processing modules and device management modules, as would be apparent to a person of ordinary skill in the art.

As noted above, in one or more embodiments, the three-level map 300, discussed further below in conjunction with FIG. 3, maps portions of the sub-blocks of the HDD 140 stored in the SSD cache 130 to a physical location in the SSD cache 130.

For additional details regarding suitable implementations of the hybrid drive controller 200, see, for example, U.S. Pat. No. 9,213,633, entitled "Flash Translation Layer With Lower Write Amplification," and/or United States Published Patent Application No. 2015/0058527, filed Aug. 20, 2013, entitled "Hybrid Memory With Associative Cache," each assigned to the assignee of the present application and incorporated by reference herein.

Figure 3:
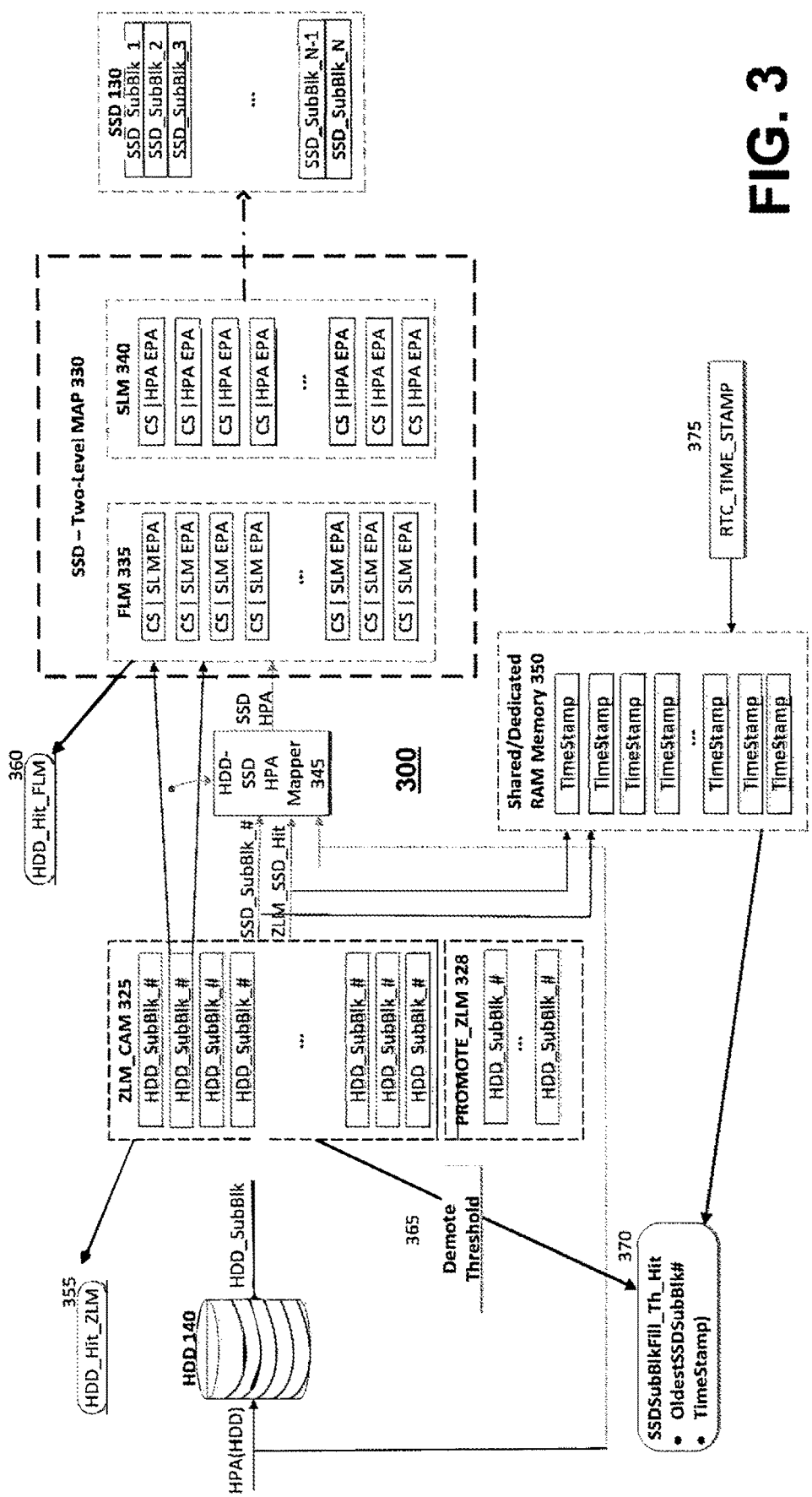
FIG. 3 illustrates the three-level map of FIGS. 1 and 2 in further detail, according to some embodiments of the disclosure.

FIG. 3 illustrates the three-level map 300 of FIGS. 1 and 2 in further detail, according to some embodiments of the disclosure. In one or more embodiments, the three-level map 300 may be implemented as a hardware translation layer or firmware, for mapping HDD addresses to SSD addresses.

As shown in FIG. 3, the exemplary three-level map 300 comprises a zero-level map (ZLM) 325, a first-level map (FLM) 335 and a second-level map (SLM) 340. The example of FIG. 3 assumes that 128 MB sub-blocks of the HDD 140 are mapped to 128 MB sub-blocks of the SSD 130. In further implementations, however, any block size can be selected, for example, to optimize workloads. In addition, in the example of FIG. 3, the exemplary SSD cache 130 has a capacity of 128 GB and the HDD 140 has a capacity of 16 TB.

In some embodiments, a given application will determine the granularity of the SSD/HDD sub-blocks, for example, depending upon Promotion and Demotion time targets without affecting host bandwidth. Based on the granularity, the number of sub-blocks for a SSD cache capacity and HDD capacity will be calculated.

Typically, the various tables (or portions thereof) of the three-level map 300 are stored in on-chip SRAM (Static Random Access Memory) or in a DRAM (Dynamic Random Access Memory) for best performance and lower latency to access the data by the host 110. Since the capacity of the SSD 130 is very small compared with the expected capacity of the HDD 140, the metadata associated with the three-level map 300 can be stored in on-chip SRAM (without a need for external DRAM memory for normal operations).

It is estimated that 2 GB of map metadata is needed for each 1 TB (terabyte) of storage capacity, adding significant cost and power considerations. Among other benefits, the three-level map 300 grows in proportion to the size of the cache (capacity of SSD 130) and is independent of the capacity of the HDD 140. In this manner, the same hybrid drive controller 200 can serve future (expanded) generations of hybrid storage systems.

In one or more embodiments, the exemplary zero-level map 325 is implemented as a content addressable memory (CAM) and comprises an entry for each sub-block of the SSD 130, where each ZLM entry identifies the sub-block (if any) of the HDD 140 that is stored in the corresponding sub-block of the SSD 130. For example, each entry address within the zero-level map 325 will reflect the SSD sub-block number. Thus, the zero-level map 325 address will point to the corresponding sub-block of the SSD 130 and the content of an entry in the zero-level map 325 will specify the corresponding HDD sub-block stored in the entry. The exemplary zero-level map 325 isolates the HPA addressing of the SSD 130 from the HPA of the HDD 140.

Generally, when the host 110 writes to (or reads from) the HDD 140 using a host page address (HPA) identifying a portion of the HDD 140, the identifier of the sub-block that includes the specified HPA is searched in the zero-level map 325 to determine if the HDD sub-block is already cached in the SSD 130 (or stored in the HDD 140). For example, for a 1 TB/1024 GB HDD, and a block size (in zero-level map 325) of 128 MB (0.128 GB), each sub-block in the HDD is equal to HDD Capacity (1 TB)/Blk Size (128 MB).

If the HDD sub-block is not found within the zero-level map 325 (shown in FIG. 3 as HDD_Hit_ZLM 355) then the entire content of the indicated HDD sub-block is either empty or inside the HDD 140 and all such I/O requests are directed directly to HDD for further handling (and outside the scope of the present disclosure). If, however, the HDD sub-block is found within the zero-level map 325 (shown in FIG. 3 as ZLM_SSD_Hit) (e.g., when access to the zero-level map 325 returns a valid SSD sub-block number) then either the sub-block (or a portion thereof) is in the SSD Cache 130, resulting in an identifier of the SSD_SubBlk_#storing the target HDD sub-block. As shown in FIG. 3, an HDD-SSD HPA Mapper 345 translates the SSD_SubBlk_#storing the target HDD sub-block to an HPA within the SSD sub-block where the desired data is stored. The search is then forwarded to the FLM table 335 to determine if the data is within the HDD 140 or the SSD 130.

As shown in FIG. 3, the HPA of the SSD 130 (provided by the zero-level map 325 when the HDD sub-block is in the SSD cache 130) is mapped to a physical location in the SSD 130 using an SSD two-level map 330. The SSD two-level map 330 comprises the first-level map (FLM) 335 and the second-level map (SLM) 340. In one or more embodiments, the first-level map 335 and second-level map 340 may be implemented using the techniques described in U.S. Pat. No. 9,213,633, entitled "Flash Translation Layer With Lower Write Amplification," assigned to the assignee of the present application and incorporated by reference herein.

Generally, the FLM 335 and SLM 340 are indexed using a quotient and a remainder, respectively, (not shown in FIG. 3) generated by an integer divider based on a number of SLM entries per SLM page, as described in U.S. Pat. No. 9,213,633. In the SSD two-level map 330 of FIG. 3, "CS" indicates the Cache State and "EPA" indicates an E-Page Address. In one or more embodiments, an E-page corresponds to a physical location within the NAND media where the HPA resides. The EPA represents the particular NAND page address within a specific NAND die, among multiple NAND dies, and in a NAND block containing multiple pages spread across substantially all NAND dies.

In some embodiments, a 128 GB capacity SSD cache 130 will need 0.256 GB of total map memory (FLM 335 and SLIM 340) plus the zero-level map 325, as described above (for an exemplary rule of thumb of 2 GB of MAP (two-level) for 1 TB of main memory, where FLM can be on chip memory). Storing the tables of the three-level map 300 on silicon is thus feasible and saves the cost of having an external non-volatile memory as well.

The hybrid drive controller 200 optionally operates with multiple modes, where in an "SSD only" storage system 100, the HDD HPA-to-SSD HPA mapping is simply bypassed; and where the hybrid functionality is enabled for a hybrid storage system 100 comprising both SSD and HDD.

For a read operation from the host 110, the three-level map 300 is evaluated to determine where the target data is located (HDD or SSD). Likewise, for a write operation, the three-level map 300 is evaluated to determine where to write the data (e.g., by identifying available sub-blocks).

Demotions

Since the number of sub-blocks within the HDD 140 is typically significantly more than the number of sub-blocks in the SSD Cache 130, in one or more embodiments, the zero-level map 325 will only have entries equal to the number of sub-blocks in the SSD cache 130. As the SSD cache 130 begins to fill, more HDD sub-blocks are allocated inside the SSD cache 130. Beyond a threshold (shown as Demote Threshold 365 in FIG. 3), some sub-blocks must be evicted that are least used by the Host 110 from the SSD cache 130 to the HDD 140, in order to allocate sub-blocks of the SSD cache 130 for new "hot" data that is coming from the Host 110. Thus, the zero-level map 325 also implements a side timestamp table 350, for example, in shared/dedicated RAM memory, with an entry for each sub-block in the SSD 130. The content of each entry in the table 350 is the latest timestamp (shown as real time clock(RTC)_Time_Stamp 375 in FIG. 3) when the Host 110 last accessed the corresponding sub-block. The timestamp table 350 is optionally stored separately from the zero-level map 325 to keep the content addressable memory design manageable and the Si are cost reasonable.

As the zero-level map 325 is allocated to sub-blocks of the SSD 130, beyond the system-defined Demote Threshold 365, detected at step 370, the zero-level map 325, implemented either in firmware or hardware, will issue an SSD-SubBlockFill_Threshold_Hit to the firmware along with the sub-block number of the oldest SSD sub-block from the timestamp table 350. The firmware will use this information to start a demote operation for each identified demoted sub-block to the HDD 140 and thereby free additional sub-blocks in the SSD 130, thereby making the freed sub-block available for new "hot" data coming from the Host 110.

Promotions

As the Host 110 begins to frequently access data that resides within the HDD 140, such data will then need to be promoted to the SSD cache 130. When the entire sub-block is within the HDD 140, the exemplary firmware promotion engine will quickly allocate the SSD sub-block to such data in the zero-level map 325 and then begins the promotion of that data with a granularity offered by one FLM entry (number of entries within SLM). The promotion can begin anywhere in the sub-block, as per host access of the data.

The Data Range within the sub-block can be immediately promoted to the SSD cache 130 without having to completely transfer the sub-block worth of data (128 MB in the present example of FIG. 3) thereby making quick data promotions and avoiding long access latencies associated with moving the entire sub-block to the SSD cache 130 before marking that the data is in the SSD cache 130.

As shown in FIG. 3 and as discussed further below in conjunction with FIG. 4, a portion (e.g., 25%) of the exemplary zero-level map 325 is employed as a promotion table 328 where the sub-block entries are used during promotions from the HDD 140 to the SSD cache 130. In one or more embodiments, the sub-block entries used for promotion may be some dedicated sub-blocks around the bottom of the ZLM table 325 or they could be spread randomly across the ZLM table 325, as needed, as would be apparent to a person of ordinary skill in the art. However, the percentage of the ZLM promote table can be a fraction of the full ZLM table in order to keep the data structures small which can reasonably fit on an on-chip SRAM and do not need an external storage solution to maintain this information. The table 325 in the example of FIG. 3 assumes that some bottom entries of the ZLM CAM 325 are dedicated for promotion purposes, for simplicity and clarity of illustration.

One or more embodiments of the disclosure recognize that an entire sub-block of data may not be "hot" within a given sub-block, and promoting the entire sub-block may affect the media endurance of the non-volatile memory because of increased write amplification due to promotions of the entire sub-blocks. In addition, in some applications, the data within a given sub-block may be sparse (e.g., with some logical block address (LBA) ranges written by the Host 110 and some LBA ranges that are not written by the Host 110).

To avoid such drawbacks, the exemplary three-level map 300 of FIG. 3 incorporates an optional extension of the zero-level map 325 so that promotion granularity can be as small as a HPA, while still allowing the benefits of dynamic sub-block allocation optimization.

Figure 4:
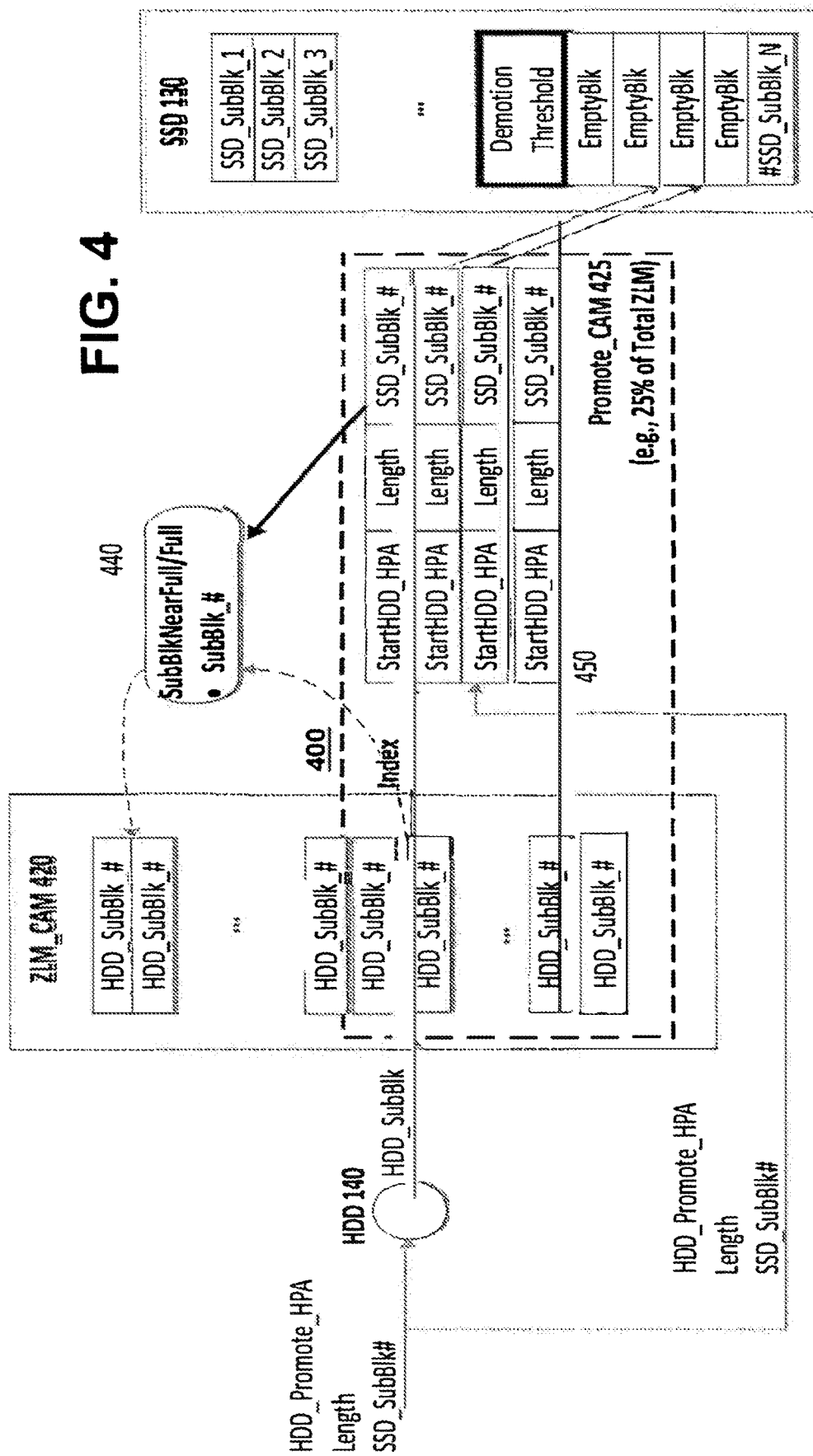
FIG. 4 illustrates a variation of the three-level map of FIG. 3, according to one or more embodiments of the disclosure.

FIG. 4 illustrates a variation 400 of the zero-level map 325 of FIG. 3, according to one or more embodiments of the disclosure. Among other benefits, the exemplary optional zero-level map variation 400 demonstrates promotion granularity as small as a single host page address (4 KB (kilobytes) in the above example). For example, if a number of 4 KB host pages are accessed in a number of random HDD sub-blocks, the multiple 4 KB host pages can be mapped to a single SDD sub-block, as discussed further below.

The exemplary zero-level map variation 400 optionally employs a portion (e.g., 25%) of the zero-level map 420 as a Promote_CAM 425. The entries in the Promote_CAM 425 are used during promotions from the HDD 140 to the SSD cache 130. The Promote_CAM 425 portion of the zero-level map 420 will also have a secondary variable length table 450 with an entry for each sub-block. The secondary table 450 records a starting HPA address and length of the data promoted from the HDD 140 to an SSD sub-block. The table 450 also records the SSD_SubBlk identifier where this data is actually written to the SSD sub-block. In this manner, a sub-block can slowly fill up to its full capacity within the SSD sub cache 130 and once that is done, then the sub-block is freed from the Promote ZLM CAM 425 and moved to primary zero-level map 420, for example, by the firmware.

It may happen that only a few HPAs within a given sub-block ever becomes "hot," whereas the remaining portions of the given sub-blocks within that space remains cold. In such situations, the same promote CAM sub-block can be used to collect "hot" data from multiple HDD sub-blocks and aggregated into a single SSD sub-block as long as the HPA promoted to one SSD sub-block from different HDD/SSD sub-blocks are non-overlapping, thereby greatly improving the efficiency of the granularity of the zero-level map 420. In addition, related promotion/demotions tradeoffs are improved, while significantly reducing the non-volatile memory (NVM) SSD write amplification. Most of these features can be implemented either in hardware or firmware (FW) and, in one or more embodiments, have full FW override control when implemented in hardware, full hardware acceleration capability can be available at the same time firmware can come back for any stage to override the hardware behavior.

For additional details regarding suitable implementations of the promotion and/or demotion aspects of hybrid drive controller 200, see, for example, United States Published Patent Application No. 2015/0058527, filed Aug. 20, 2013, entitled "Hybrid Memory With Associative Cache," assigned to the assignee of the present application and incorporated by reference herein.

Recovery and Coherence

Generally, the three-level map 300 of FIG. 3 can be recovered on power-up by reading the pages in the SSD 130 to obtain the HPAs of the cached HDD sub-blocks to rebuild the tables of the three-level map 300. In event of a power failure, the contents of the three-level map 300 will be lost and the mapping between sub-blocks of the HDD 140 and sub-blocks of the SSD 130 is also lost. In one or more embodiments, the exemplary three-level map 300 is fully coherent and allows rebuilding the maps of the three-level map 300 from the user data itself in the SSD 130, after a power failure event occurs. Since the Host HPA information is stored along with the data in the SSD 130, the FLM 335 and SLM 340 can be built after a power failure. Once the FLM 335 and SLM 340 are regenerated, along with the Host LBA number information from the SSD cache 130, the zero-level map 325 can then be reprogrammed back to the desired HDD to SSD HPA Mapping, even if this mapping is not the same as the block mapping that was present before the power failure event. In this manner, the zero-level map 325 is immune to power failure events and truly self-healing. Furthermore, complex firm ware coherency and recovery overheads to rebuild the zero-level map 325 after a power failure event are avoided.

For additional details regarding recovery and coherence of the three-level map 300, see, for example, U.S. Pat. No. 9,213,633, entitled "Flash Translation Layer With Lower Write Amplification," assigned to the assignee of the present application and incorporated by reference herein.

Caching Data Structures for Tracking Data Hotness and/or Coldness

FIG. 5 illustrates a sample promotion table 500, according to one or more embodiments of the disclosure. The illustrative promotion table 500 serves as a hotness tracker to monitor when data should be promoted from the HDD 140 to the SSD cache 130. As shown in FIG. 5, the promotion table 500 records a timestamp of a most recent access of a given sub-block, as well as a write count and read count for the respective sub-block. The promotion table 500 can be stored, for example, in local CPU DRAM. The data that is already in the SSD cache 130 is already "hot" until it become cold via the demotion timestamp table 350 in the three-level map 300. Data that is getting "hot" from the HDD 140 is instantaneous and hence, in one or more embodiments, the table 500 only needs to cover the instantaneous data temperature changes within the HDD and not record information about the entire cold data within the HDD 140. With the approach shown in FIG. 5, the caching structure can be implemented within CPU DRAM, thereby saving on Si cost and power, and access latencies seen by the host 110. In one or more embodiments, oldest entries (e.g., Least Recently used) in the promotion table 500 are overwritten.

A coldness tracker can be implemented within the condensed zero-level map 325 on a sub-block basis.

Conclusion

It should be understood that the particular hybrid storage arrangements illustrated in FIGS. 1 through 5 are presented by way of illustrative example only, and should not be construed as limiting in any way. Numerous alternative configurations of system and device elements and associated processing operations can be used in other embodiments.

Illustrative embodiments disclosed herein can provide a number of significant advantages relative to conventional arrangements.

For example, one or more embodiments provide significantly reduced write amplification. The disclosed three-level maps 300 provide a translation from, for example, logical block addresses (LBAs) in a logical block address space (such as used by a host) to physical addresses in a non-volatile memory (NVM), such as a solid state disk/drive (SSD) or a hard disk drive (HDD). SSDs using some NVM types such as NAND flash use garbage collection (or recycling) to reclaim free space created when an logical block address (LBA) is over-written with new data (rendering a previous physical location associated with that LBA unused). Garbage collection causes write amplification—a multiplicative factor on the amount of host data written versus the amount of data written to NVM. There are multiple components of write amplification, including a map component of write amplification (termed map write amplification). The map write amplification arises from a need to save the three-level maps 300 in a non-volatile memory and any necessary recycling of the three-level maps 300. In storage devices that reduce the user data, the map write amplification is a larger fraction of the total write amplification, since the data write amplification is decreased.

In some embodiments, improved hybrid storage techniques are provided that employ a cache memory device, such as an SSD, as a cache for another storage device, such as a HDD or another SSD. A hybrid controller in at least one embodiment maps sub-blocks of the HDD storage device that are stored in the SSD cache to corresponding physical locations in the SSD memory device using a three-level map identifying portions of the HDD storage device that are cached in sub-blocks of the SSD memory device. In some embodiments, a size of the three-level map is independent of a capacity of the first storage device. In addition, in some embodiments, improved techniques are provided for recovery and coherence, as well as promotion and demotion of data into, and out of, the SSD cache, respectively.

It is to be appreciated that the particular advantages described above and elsewhere herein are associated with particular illustrative embodiments and need not be present in other embodiments. Also, the particular types of hybrid storage features and functionality as illustrated in the drawings and described above are exemplary only, and numerous other arrangements may be used in other embodiments.

As mentioned previously, at least portions of the disclosed hybrid storage system may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines. The cloud infrastructure further comprises sets of applications running on respective ones of the virtual machines. These and other types of cloud infrastructure can be used to provide what is also referred to herein as a multi-tenant environment. One or more system components such as hybrid drive controller 200, or portions thereof, are illustratively implemented for use by tenants of such a multi-tenant environment.

The disclosed hybrid storage arrangements may be implemented using one or more processing platforms. One or more of the processing modules or other components may therefore each run on a computer, storage device or other processing platform element. A given such element may be viewed as an example of what is more generally referred to herein as a "processing device." An exemplary processing platform comprises at least a portion of the given system and includes at least one processing device comprising a processor coupled to a memory. The processor may comprise a microprocessor, a microcontroller, an application specific integrated circuit (ASIC), a field programmable gate array (FPGA) or other type of processing circuitry, as well as portions or combinations of such circuitry elements. The memory may comprise random access memory (RAM), read only memory (ROM) or other types of memory, in any combination. The memory and other memories disclosed herein should be viewed as illustrative examples of what are more generally referred to as "processor-readable storage media" storing executable program code of one or more software programs. The exemplary processing device may also comprise network interface circuitry, which is used to interface the processing device with a network and other system components, and may comprise conventional transceivers.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the hybrid storage system. Such components can communicate with other elements of the hybrid storage system over any type of network or other communication media.

As indicated previously, components of an information processing system as disclosed herein can be implemented at least in part in the form of one or more software programs stored in memory and executed by a processor of a processing device. For example, at least portions of the functionality of the three-level mapping process of FIG. 3 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and hybrid storage systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A device, comprising:
   a primary storage device comprising a plurality of primary sub-blocks;
   a cache memory device comprising a plurality of cache sub-blocks implemented as a cache for the primary storage device; and
   a controller configured to implement a three-level map comprising:
      a zero-level map identifying primary sub-blocks of the primary storage device having at least a portion thereof cached in one of the plurality of cache sub-blocks of the cache memory device, wherein a size of the zero-level map is independent of a capacity of the primary storage device, and
      a two-level map mapping host page addresses to physical locations in the cache sub-blocks where data associated with each cached host page address resides, the two-level map formed by a plurality of second-level map pages, each of the plurality of second-level pages being associated with a respective one of a plurality of first-level map entries.

2. The device of claim 1, wherein the zero-level map is implemented as a content addressable memory where an address of an entry identifies one of the plurality of cache sub-blocks of the cache memory device and where a content of the entry identifies the one or more primary sub-blocks of the primary storage device having at least a portion thereof stored in the cache sub-block.

3. The device of claim 1, wherein the cache memory device comprises a solid-state drive (SSD) and wherein the primary storage device comprises one or more of a hard disk drive (HDD) and another solid-state drive.

4. The device of claim 1, the controller further implementing a primary storage device-to-cache memory device mapper identifying where a given portion of the primary storage device is stored within one or more cache sub-blocks of the cache memory device, and wherein the primary storage device-to-cache memory device mapper provides an index into the two-level map.

5. The device of claim 1, wherein the two-level map is recovered using data in the cache memory device and wherein the zero-level map is regenerated to obtain the mapping of the at least one portion of the one or more primary sub-blocks of the primary storage device stored in the cache to the physical location in the cache memory device.

6. The device of claim 1, wherein the zero-level map further comprises a timestamp indicating when each cache sub-block was last accessed, the controller configured to evict a least recently used cache sub-block when the cache memory device reaches a predefined capacity threshold.

7. The device of claim 1, wherein data within the primary storage device is promoted to the cache in the cache memory device based on an access frequency of the data.

8. The device of claim 7, wherein an amount of the data from the primary storage device that is promoted to the cache in the cache memory device is configurable.

9. The device of claim 7, wherein the controller is further configured to promote a plurality of portions of a plurality of random primary sub-blocks from the primary storage device to one cache sub-block in the cache memory device.

10. The device of claim 1, wherein each of the plurality of second-level map pages comprises a plurality of entries, each second-level map page entry mapping a host page address to a physical location in an associated cache sub-block of the cache memory where data associated with the host page address resides.

11. The device of claim 10, wherein the controller is configured to divide an incoming host page address by a number of entries in each secondary-level map page resulting in a quotient and remainder, the resulting quotient used as an index into the first-level map to select an entry and its associated second-level map page, and the resulting remainder used as an index of into the selected second-level map page to select the physical location in the cache memory from the second-level map page entry.

12. A method of mapping a host page address associated with data stored in a primary storage device comprising a plurality of primary sub-blocks to a physical location of the data cached in a cache memory device comprising a plurality of cache sub-blocks utilizing a three-level map, the method comprising:

mapping at least one of the plurality of primary sub-blocks storing the data associated with the host page address to one of the plurality of cache sub-blocks caching at least a portion of the data using a zero-level map identifying primary sub-blocks of the primary storage device having at least a portion thereof cached in one of the plurality of cache sub-blocks of the cache memory device, wherein a size of the zero-level map is independent of a capacity of the primary storage device; and mapping the host page address to a physical location in the cache sub-block caching the at least a portion of the data using a two-level map mapping host page addresses to physical locations in cache sub-blocks where data associated with each cached host page address resides, the two-level map formed by a plurality of second-level map pages, each of the plurality of second-level pages being associated with a respective one of a plurality of first-level map entries.

13. The method of claim 12, wherein the zero-level map is implemented as a content addressable memory where an address of an entry identifies one of the plurality of cache sub-blocks of the cache memory device and where a content of the entry identifies primary sub-block of the primary storage device having at least a portion thereof stored in the cache sub-block.

14. The method of claim 12, wherein the zero-level map further comprises a timestamp indicating when each cache sub-block was last accessed, and wherein a least recently used cache sub-block is evicted when the cache memory device reaches a predefined capacity threshold.

15. The method of claim 12, wherein data within the primary storage device is promoted to the cache in the cache memory device based on an access frequency of the data.

16. A non-transitory processor-readable storage media storing executable program code that, when executed by a controller of a hybrid storage device, causes the controller to:

map a first primary sub-block of a plurality of primary sub-blocks of a primary storage device, the first primary sub-block storing data associated with a host page address, to a first cache sub-block of a plurality of cache sub-blocks of a cache memory device implemented as a cache for the primary storage device, the first cache sub-blocks caching at least a portion of the data, using a zero-level map identifying primary sub-blocks of the primary storage device having at least a portion thereof cached in one of the plurality of cache sub-blocks of the cache memory device, wherein a size of the zero-level map is independent of a capacity of the primary storage device; and map the host page address to a physical location in the cache sub-block caching the at least a portion of the data using a two-level map mapping host page addresses to physical locations in cache sub-blocks where data associated with each cached host page address resides, the two-level map formed by a plurality of second-level map pages, each of the plurality of second-level pages being associated with a respective one of a plurality of first-level map entries.

17. The non-transitory processor-readable storage media of claim 16, wherein the zero-level map is implemented as a content addressable memory where an address of an entry identifies one of the plurality of cache sub-blocks of the cache memory device and where a content of the entry identifies the primary sub-block of the primary storage device having at least a portion thereof stored in the cache sub-block.

18. The non-transitory processor-readable storage media of claim 16, wherein the cache memory device comprises a solid-state drive (SSD) and wherein the primary storage device comprises one or more of a hard disk drive (HDD) and another solid-state drive.

19. The non-transitory processor-readable storage media of claim 16, storing further executable program code that causes the controller to recover the two-level map using data in the cache memory device and regenerate the zero-level map to obtain the mapping of the primary sub-blocks of the primary storage device to cache sub-blocks of the cache memory device having at least a portion of the primary sub-block cached therein.

20. The non-transitory processor-readable storage media of claim 16, wherein each of the plurality of second-level map pages comprises a plurality of entries, each second-level map page entry mapping a host page address to a physical location in an associated cache sub-block of the cache memory where data associated with the host page address resides.

* * * * *